United States Patent
Hatakeyama

(10) Patent No.: US 7,523,229 B2
(45) Date of Patent: Apr. 21, 2009

(54) MEMORY PROTECTION DURING DIRECT MEMORY ACCESS

(75) Inventor: Tetsuo Hatakeyama, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 420 days.

(21) Appl. No.: 11/237,972

(22) Filed: Sep. 29, 2005

(65) Prior Publication Data

US 2006/0075158 A1  Apr. 6, 2006

(30) Foreign Application Priority Data

Sep. 30, 2004  (JP) .............................. 2004-288217

(51) Int. Cl.
*G06F 13/28* (2006.01)
(52) U.S. Cl. .............................. 710/28; 710/22; 710/23; 710/26
(58) Field of Classification Search .................... 710/28
See application file for complete search history.

(56) References Cited

U.S. PATENT DOCUMENTS 5,347,634 A * 9/1994 Herrell et al. ............... 345/539
5,584,010 A * 12/1996 Kawai et al. ................ 711/117
7,073,173 B1 * 7/2006 Willman ........................ 718/1

OTHER PUBLICATIONS

John Henderson, David Patterson, Computer Architecture: A Quantitative Approach, 2 ed., Morgan Kaufmann Publisher Inc., p. 501-504, Figure 6.15 (Jun. 1, 1996).

* cited by examiner

*Primary Examiner*—Henry W. H. Tsai
*Assistant Examiner*—Kris Rhu
(74) *Attorney, Agent, or Firm*—Pillsbury Winthrop Shaw Pittman, LLP

(57) ABSTRACT

An I/O controller to which an I/O device is connected includes a DMA controller (DMAC) and an access control unit (ACU). The DMAC executes DMA transfer in accordance with data transfer control information set in a control/status register by a user process. The ACU limits execution of DMA transfer by the DMAC based on access control information set in a control/status register by a privileged process, and disables the DMAC from accessing any memory area other than the memory area that can be accessed by the user process.

10 Claims, 4 Drawing Sheets

MEMORY PROTECTION DURING DIRECT MEMORY ACCESS

RELATED APPLICATIONS

The present disclosure relates to the subject matter contained in Japanese Patent Application No. 2004-288217 filed on Sep. 30, 2004, which is incorporated herein by reference in its entirety.

BACKGROUND

1. Field of the Invention

The present invention relates to an information processing apparatus for executing data transfer between an I/O device and memory by direct memory access (DMA) and a data transfer control method used with the apparatus.

2. Description of the Related Art

Generally, a computer system having a multiprocess function capable of concurrently executing a plurality of processes uses a mechanism for protecting each process from any other process. To implement this mechanism, a processor usually has two execution modes of a privileged mode and a user mode. The kernel of an operating system, etc., operates in the privileged mode and each user process operates in the user mode. The user mode is also called general mode in some cases. In the privileged mode, all instructions including special instructions for controlling a memory management unit (MMU), etc., in the processor can be executed and accessible memory space is not limited. To realize memory protection, the privileged process like the kernel uses the MMU to manage the memory space that can be accessed by each user process.

Recently, a system architecture using direct memory access (DMA) has been used to release a CPU from data transfer processing between an I/O (Input/Output) device and memory (Refer to the document "Computer Architecture A Quantitative Approach Second Edition" as cited below) In a system described in the document, an I/O controller having a DMA capability is provided. The I/O controller can execute data transfer between an I/O device and memory by DMA while a processor executes any other task.

David A. Patterson and John L. Hennessy, "Computer Architecture A Quantitative Approach Second Edition," Morgan Kaufmann Publishers Inc., Jun. 1, 1996, p. 501-504, FIG. 6.15

SUMMARY

However, in the system including the I/O controller having the DMA capability, it becomes difficult to realize memory protection, since the MMU can limit access from the processor to memory, but cannot limit memory access using the DMA capability.

Thus, in the system including the I/O controller having the DMA capability, often DMA transfer is controlled by a privileged process operating in the privileged mode like the kernel. In this case, each user process cannot direct control the DMA capability of the I/O controller and thus the DMA capability must always be controlled via the privileged process. This results in an increase in overhead and becomes a large factor of degrading the system performance.

The present invention provides an information processing apparatus and a data transfer control method for making it possible to realize memory protection and efficiently execute DMA transfer.

According to a first aspect of the invention, there is provided an information processing apparatus that executes a plurality of processes concurrently, the information processing apparatus including: a processor that executes each of the processes in either one of a privileged mode and a user mode; a memory device; an I/O controller that controls an I/O device and is provided with a first register that is mapped to address space accessible by a user process operating in the user mode, and a second register that is mapped to address space accessible by a privileged process operating in the privileged mode; a direct memory access controller that is installed in the I/O controller and performs data transfer between the I/O device and the memory device based on data transfer control information that is set in the first register by the user process; and an access control unit that is installed in the I/O controller and limits data transfer operation of the direct memory access controller based on access control information set in the second register by the privileged process and disables the direct memory access controller from accessing any area other than a predetermined area in the memory device that is accessible by the user process.

According to a second aspect of the invention, there is provided an information processing apparatus that executes a plurality of processes concurrently, the information processing apparatus including: a processor that executes each of the processes in either one of a privileged mode and a user mode; a memory device; a first I/O controller that controls a first I/O device and is provided with a first register that is mapped to address space accessible by a first user process operating in the user mode, and a second register that is mapped to address space accessible by a privileged process operating in the privileged mode; a second I/O controller that controls a second I/O device and is provided with a third register that is mapped to address space accessible by a second user process operating in the user mode, and a fourth register that is mapped to address space accessible by a privileged process operating in the privileged mode; a first direct memory access controller that is installed in the first I/O controller and performs data transfer between the first I/O device and the memory device based on data transfer control information that is set in the first register by the first user process; a first access control unit that is installed in the first I/O controller and limits data transfer operation of the first direct memory access controller based on access control information set in the second register by the privileged process and disables the first direct memory access controller from accessing any area other than a first area in the memory device that is accessible by the first user process; a second direct memory access controller that is installed in the second I/O controller and performs data transfer between the second I/O device and the memory device based on data transfer control information that is set in the third register by the second user process; and a second access control unit that is installed in the second I/O controller and limits data transfer operation of the second direct memory access controller based on access control information set in the fourth register by the privileged process and disables the second direct memory access controller from accessing any area other than a second area in the memory device that is accessible by the second user process.

According to a third aspect of the invention, there is provided a data transfer control method for controlling data transfer between an I/O device and a memory device executed by an I/O controller, wherein the I/O controller is provided with a direct memory access controller for executing the data transfer, a first register mapped to address space that is accessible by a user process, and a second register mapped to address space that is accessible by a privileged process, the data transfer control method including: executing processing of setting access control information in the second register by the privileged process; executing processing of setting data transfer control information for controlling the operation of the direct memory access controller in the first register by the user process; monitoring an address output from the direct memory access controller; determining whether or not the monitored address belongs to an address range corresponding to a predetermined area in the memory device that is accessible by the user process; and disabling the direct memory access controller from executing the data transfer operation when the address output from the direct memory access controller belongs to an address range that is out of the address range corresponding to the predetermined area.

DETAILED DESCRIPTION OF THE EMBODIMENT

Hereinafter, an embodiment of the invention will be described by reference to the drawings in detail.

Figure 1:
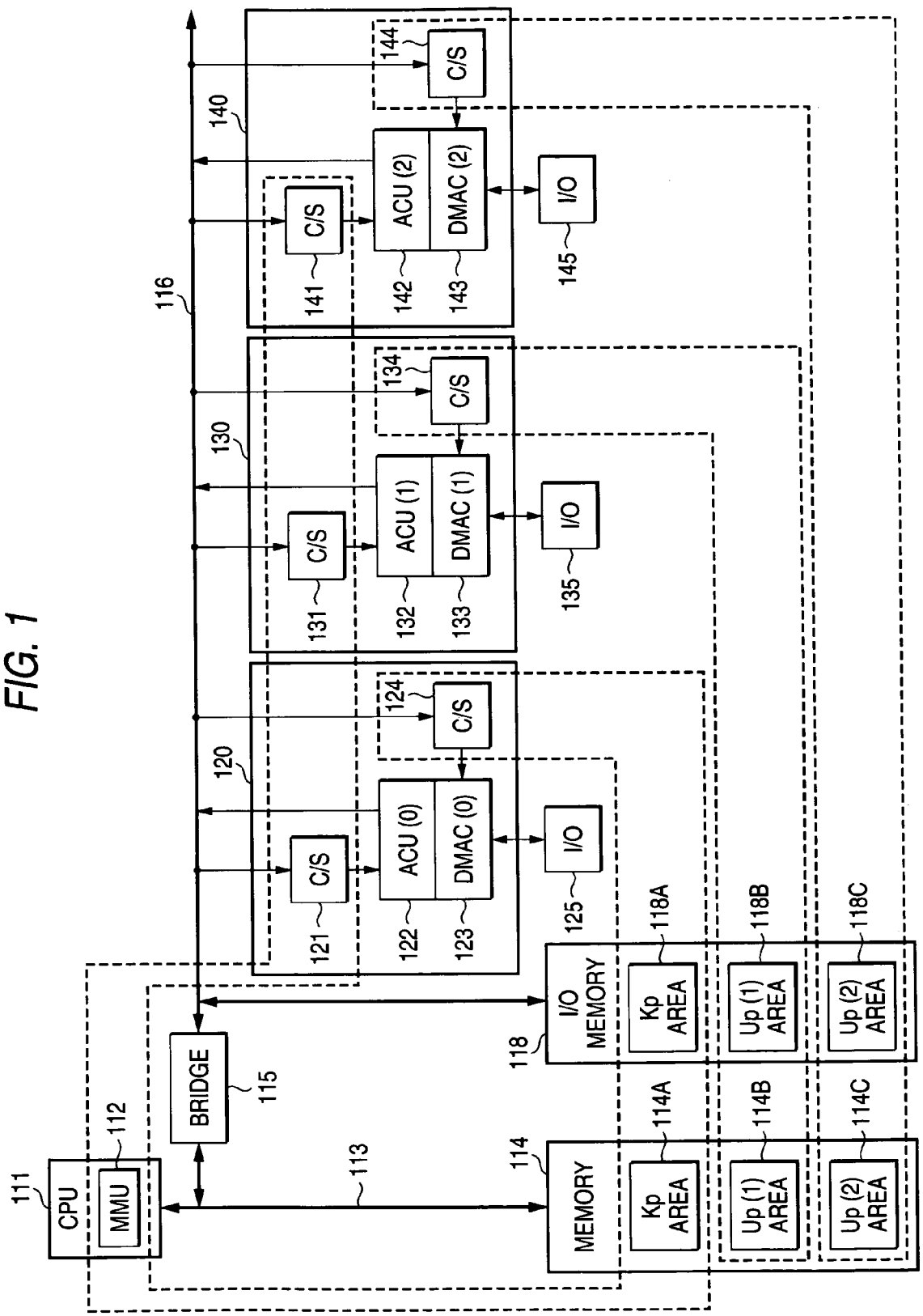
FIG. 1 is a block diagram to show a configuration example of an information processing apparatus according to an embodiment.

FIG. 1 shows a configuration example of an information processing apparatus according to an embodiment of the invention. The information processing apparatus is a computer using a microprocessor and is implemented as a personal computer, a server computer, a built-in system for various electronic machines, or the like, for example.

The information processing apparatus supports a multiprocess function capable of concurrently executing a plurality of processes, and includes a CPU 111, a memory bus 113, memory 114, a bridge 115, an I/O bus 116, I/O memory 118, I/O controllers 120, 130, and 140, and I/O devices 125, 135, and 145.

The CPU 111 and the memory 114 are connected to the memory bus 113. The I/O memory 118 and the I/O controllers 120, 130, and 140 are connected to the I/O bus 116. The bridge 115 is placed between the memory bus 113 and the I/O bus 116. The bridge 115 is an interface device for interconnecting the memory bus 113 and the I/O bus 116.

The I/O devices 125, 135, and 145 can operate independently of each other. The I/O controllers 120, 130, and 140 are provided in a once-to-one correspondence with the I/O devices 125, 135, and 145. The I/O controllers 120, 130, and 140 control the corresponding I/O devices 125, 135, and 145. Each of the I/O controllers 120, 130, and 140 has a DMA capability.

The CPU 111 is a processor for controlling the components installed in the information processing apparatus. The CPU 111 includes a memory management unit (MMU) 112 for realizing virtual addresses and memory protection. The CPU 111 has two execution modes of a privileged mode and a user mode. In the privileged mode, all instructions including special instructions for controlling the MMU 112, etc., can be executed and accessible memory space is not limited. On the other hand, in the user mode, the types of executable instructions are limited and the accessible memory space is also limited by the MMU 112. A privileged process like the kernel operates in the privileged mode and each user process operates in the user mode.

FIG. 1 assumes that a total of three processes of a privileged process, a first user process, and a second user process are executed. Different areas in the memory 114 are allocated to the privileged process, the first user process, and the second user process. For example, the first user process is a process for controlling the I/O device 135, and the second user process is a process for controlling the I/O device 145.

The relationship between the allocated areas in the memory 114 and the processes using the areas is as follows:
  Kp area 114A: Privileged process
  Up (1) area 114B: First user process
  Up (2) area 114C: Second user process Different areas in the I/O memory 118 are also allocated to the privileged process, the first user process, and the second user process. The relationship between the allocated areas in the I/O memory 118 and the processes using the areas is as follows:
  Kp area 118A: Privileged process
  Up (1) area 118B: First user process
  Up (2) area 118C: Second user process The Kp area 114A and the Kp area 118A can be used only by the privileged process. The Up (1) area 114B and the Up (1) area 118B are areas that can be accessed by the first user process. The Up (2) area 114C and the Up (2) area 118C are areas that can be accessed by the second user process.

The I/O controller 120 includes a control/status register (C/S) 121, an access control unit (ACU) 122, a DMA controller (DMAC) 123, a C/S 124, and the like.

The C/S 121 is a register for storing access control information to limit memory access by the DMAC 123. The access control information is address information to specify the address ranges of the areas in the memory 114 and the I/O memory 118 that can be accessed by the DMAC 123. The C/S 121 is mapped to the address space that can be accessed by the privileged process. Thus, only the privileged process is allowed to operate the C/S 121, and each user process cannot operate the C/S 121.

The ACU 122 limits the data transfer operation of the DMAC 123 based on the access control information set in the C/S 121 by the privileged process. That is, the ACU 122 monitors the address output from the DMAC 123 and executes processing of determining whether or not the address belongs to the address range specified by the access control information stored in the C/S 121. The ACU 122 determines whether or not memory access by the DMAC 123 is enabled in accordance with the result of the determination processing.

The C/S 124 is a register (DMA register) for storing data transfer control information (DMA parameter) to control the data transfer operation between the I/O device 125 and the memory 114 and the I/O memory 118 by the DMAC 123. The process for controlling the I/O device 125 is allowed to operate the C/S 124. In the embodiment, the relationship between the I/O devices and the processes is as follows:
  DMA transfer between I/O device 125 and memory 114, 118: Privileged process
  DMA transfer between I/O device 135 and memory 114, 118: First user process
  DMA transfer between I/O device 145 and memory 114, 118: Second user process In this case, only the privileged process is allowed to operate the C/S 124. This means that the C/S 124 is mapped to the address space that can be accessed by the privileged process.

The DMAC 123 executes DMA transfer between the I/O device 125 and the memory 114, 118 according to the data transfer control information set in the C/S 124 by the privileged process.

Like the I/O controller 120, the I/O controller 130 includes a C/S 131, an ACU 132, a DMAC 133, a C/S 134, and the like. The C/S 131 is a register for storing access control information to limit memory access by the DMAC 133. The access control information is address information to specify the address ranges of the areas in the memory 114 and the I/O memory 118 that can be accessed by the DMAC 133. The C/S 131 is mapped to the address space that can be accessed by the privileged process. Thus, only the privileged process is allowed to operate the C/S 131, and each user process cannot operate the C/S 131.

The ACU 132 limits the data transfer operation of the DMAC 133 based on the access control information set in the C/S 131 by the privileged process. That is, the ACU 132 monitors the address output from the DMAC 133 and executes processing of determining whether or not the address belongs to the address range specified by the access control information stored in the C/S 131. The ACU 132 determines whether or not memory access by the DMAC 133 is enabled in accordance with the result of the determination processing.

The C/S 134 is a register (DMA register) for storing data transfer control information (DMA parameter) to control the data transfer operation between the I/O device 135 and the memory 114 and the I/O memory 118 by the DMAC 133. The process for controlling the I/O device 135 is allowed to operate the C/S 134. In the embodiment, the C/S 134 is mapped to the memory space that can be accessed by the first user process so as to enable the first user process to directly operate the DMAC 133.

Like the I/O controller 120, the I/O controller 140 is also made up of a C/S 141, an ACU 142, a DMAC 143, a C/S 144, and the like.

The C/S 141 is a register for storing access control information to limit memory access by the DMAC 143. The access control information is address information to specify the address ranges of the areas in the memory 114 and the I/O memory 118 that can be accessed by the DMAC 143. The C/S 141 is mapped to the address space that can be accessed by the privileged process. Thus, only the privileged process is allowed to operate the C/S 141, and each user process cannot operate the C/S 141.

The ACU 142 limits the data transfer operation of the DMAC 143 based on the access control information set in the C/S 141 by the privileged process. That is, the ACU 142 monitors the address output from the DMAC 143 and executes processing of determining whether or not the address belongs to the address range specified by the access control information stored in the C/S 141. The ACU 142 determines whether or not memory access by the DMAC 143 is enabled in accordance with the result of the determination processing.

In the embodiment, the ACU 122, ACU 132 and ACU 142 serve as a monitoring unit that monitors the address output from the direct memory access controller to limit the data transfer operation of the direct memory access controller.

The ACU 122, ACU 132 and ACU 142 also serve as a disabling unit that disables the direct memory access controller from executing the data transfer operation when the address output from the direct memory access controller belongs to an address range that is out of the address range corresponding to the predetermined area.

The C/S 144 is a register (DMA register) for storing data transfer control information (DMA parameter) to control the data transfer operation between the I/O device 145 and the memory 114 and the I/O memory 118 by the DMAC 143. The process for controlling the I/O device 145 is allowed to operate the C/S 144. In the embodiment, the C/S 144 is mapped to the memory space that can be accessed by the second user process so as to enable the second user process to directly operate the DMAC 143.

In the embodiment, the first user process can set the data transfer control information in the C/S 134 through the I/O bus 116, thereby directly controlling the DMAC 133 without the intervention of the privileged process. Likewise, the second user process can set the data transfer control information in the C/S 144 through the I/O bus 116, thereby directly controlling the DMAC 143 without the intervention of the privileged process.

The privileged process can operate the MMU 112 and the C/S 131 and the C/S 141, thereby realizing the following access control for access to the memory 114 and the I/O memory 118 by the first user process and the second user process:

1) Access control for the first user process: Access from the CPU 111 is limited only to the Up (1) areas 114B and 118B by the MMU 112. Access from the DMAC 133 is limited only to the Up (1) areas 114B and 118B by the ACU 132. The CPU 111 is allowed to access the C/S 134.

2) Access control for the second user process: Access from the CPU 111 is limited only to the Up (2) areas 114C and 118C by the MMU 112. Access from the DMAC 143 is limited only to the Up (2) areas 114C and 118C by the ACU 142. The CPU 111 is allowed to access the C/S 144.

Next, an operation sequence of the DMA transfer processing will be discussed with reference to FIGS. 2 and 3 by taking the I/O controller 130 as an example.

Figure 2:
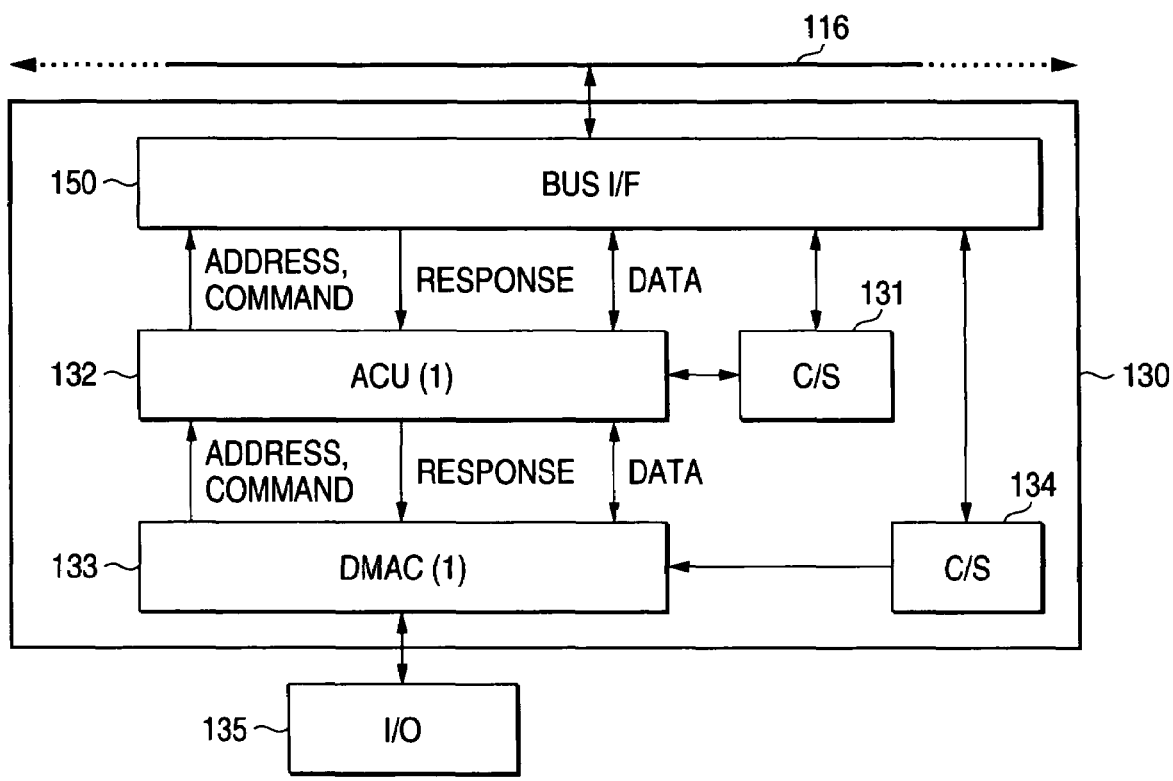
FIG. 2 is a block diagram to describe the configuration of an I/O controller used with the information processing apparatus shown in FIG. 1.

FIG. 2 is a block diagram to show a flow of processing executed inside the I/O controller 130.

The I/O controller 130 is connected to the I/O bus 116 through a bus interface (I/F) 150 provided inside the I/O controller 130.

The ACU 132 is placed between the DMAC 133 and the bus I/F 150. The DMAC 133 executes a memory cycle. An address and a command (read/write) from the DMAC 133 are output onto the I/O bus 116 through the ACU 132 and the bus I/F 150. A response from the memory 114 or the I/O memory 118 is sent to the DMAC 133 through the bus I/F 150 and the ACU 132.

The ACU 132 monitors the address output from the DMAC 133 and determines whether or not the address belongs to the address range of the Up (1) area, specified by the access control information stored in the C/S 131. The ACU 132 enables or disables access by the DMAC 133 in accordance with the determination result. If the address output from the DMAC 133 does not belong to the address range of the Up (1) area 114B or 118B, the ACU 132 does not output the address or the command from the DMAC 133 onto the I/O bus 116 through the bus I/F 150 and transmits a response for forcibly terminating the memory cycle to the DMAC 133 and also stores the address from the DMAC 133 in the C/S 131 as error address information. The error address information stored in the C/S 131 is sent to the privileged process by an interrupt signal transmitted from the I/O controller 130 to the CPU 111.

Figure 3:
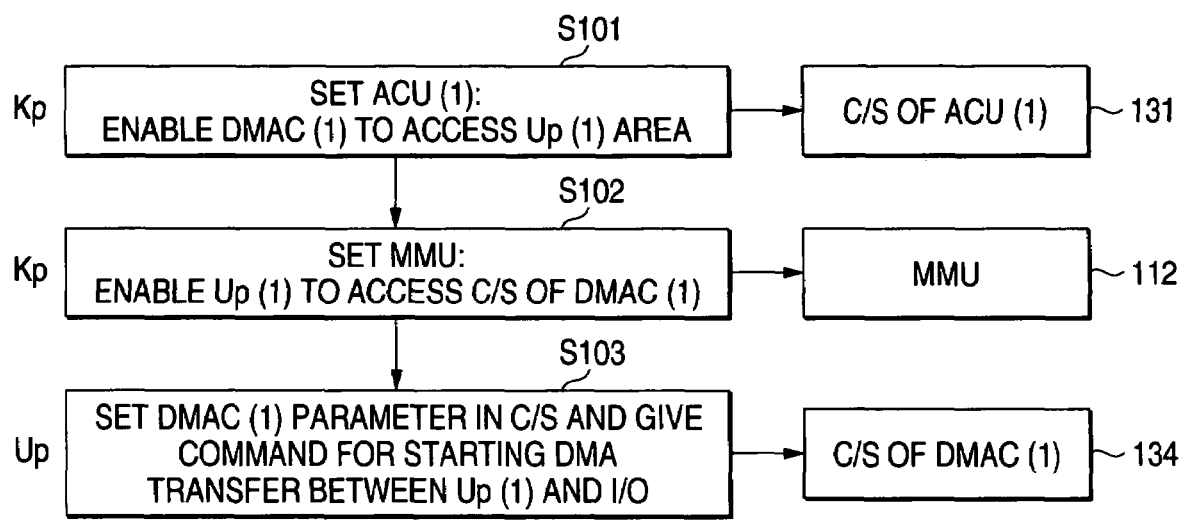
FIG. 3 is a flowchart to show a procedure of processing executed by a user process and a privileged process executed in the information processing apparatus shown in FIG. 1.

A flowchart of FIG. 3 shows a procedure of processing executed by the privileged process and the user process.

The privileged process (Kp) sets up the ACU 132 to enable the DMAC 133 to access the Up (1) area 114B in the memory 114 and the Up (1) area 118B in the I/O memory 118 (step S101). At step S101, the privileged process (Kp) sets the access control information to specify the address range of the Up (1) area 114B, 118B in the C/S 131 through the I/O bus 116. The privileged process (Kp) operates the MMU 112 to enable the first user process (Up (1)) to directly operate the DMAC 133, thereby allocating the address space for accessing the C/S 134 to the first user process (Up (1)) (step S102).

The first user process (Up (1)) sets the data transfer control information in the C/S 134 through the I/O bus 116, thereby commanding the DMAC 133 to execute DMA transfer (step S103).

Figure 4:
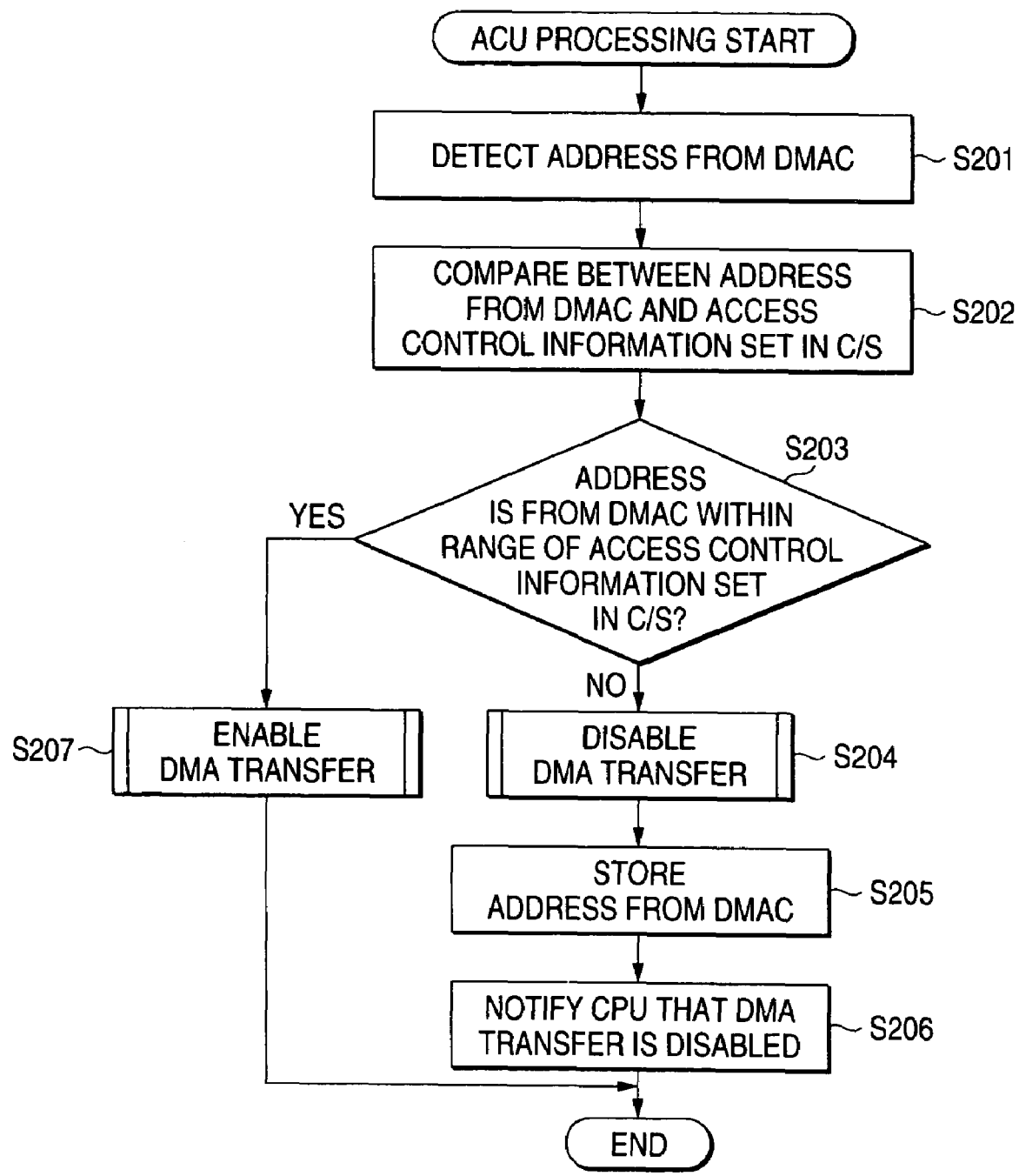
FIG. 4 is a flowchart to describe the operation of an access control unit installed in the information processing apparatus shown in FIG. 1.

Next, an operation sequence executed by the ACU 132 installed in the I/O controller 130 will be discussed with reference to a flowchart of FIG. 4.

First, the ACU 132 detects the memory address output from the DMAC 133 (step S201). Next, the ACU 132 makes a comparison between the detected memory address from the DMAC 133 and the access control information set in the C/S 131 (step S202) and determines whether or not the memory address belongs to the range of the memory addresses that can be accessed by the first user process (step S203). If the memory address from the DMAC 133 belongs to the range of the memory addresses that can be accessed by the first user process (YES at step S203), the ACU 132 enables DMA transfer (step S207). At step S207, the ACU 132 transmits the memory address from the DMAC 133 to the I/F 150.

On the other hand, if the memory address from the DMAC 133 does not belong to the range of the memory addresses hat can be accessed by the first user process (NO at step S203), the ACU 132 forcibly terminates the memory cycle started by the DMAC 133 and disables execution of DMA transfer (step S205). After this, the ACU 132 stores the memory address from the DMAC 133 in the C/S 131 (step S205). The ACU 132 notifies the stored memory address from the DMAC 133 to the CPU 111 (step S206).

In the embodiment, the ACU 122, ACU 132 and ACU 142 serve as a storing unit that stores the address output from the direct memory access controller in the second register to notify the address to the privileged process when the direct memory access controller is disabled from executing the data transfer operation.

As described above, in the embodiment, each user process can operate the DMAC directly, so that data transfer between I/O device and memory can be executed efficiently. Since the ACUs are provided in a one-to-one correspondence with the DMACs, memory access executed by each DMAC can be limited by the privileged process.

As described with reference to the embodiment, there is provided an information processing apparatus that executes a plurality of processes concurrently, the information processing apparatus including: a processor having a privileged mode and a user mode; a memory; an I/O controller having a first register mapped to address space that can be accessed by a user process operating in the user mode and a second register mapped to address space that can be accessed by a privileged process operating in the privileged mode for controlling an I/O device; a direct memory access controller being installed in the I/O controller for executing data transfer between the I/O device and the memory based on data transfer control information set in the first register by the user process; and an access control unit being installed in the I/O controller for limiting data transfer operation of the direct memory access controller based on access control information set in the second register by the privileged process and disabling the direct memory access controller from accessing any area other than a predetermined area in the memory that can be accessed by the user process.

According to the configuration above, it is possible to realize memory protection and efficiently execute DMA transfer.

It is to be understood that the present invention is not limited to the specific embodiment described above and that the invention can be embodied with the components modified without departing from the spirit and scope of the invention. The invention can be embodied in various forms according to appropriate combinations of the components disclosed in the embodiment described above. For example, some components may be deleted from all components shown in the embodiment. Further, the components in different embodiments may be used appropriately in combination.

What is claimed is:

1. An information processing apparatus that executes a plurality of processes concurrently, the information processing apparatus comprising:
   a processor that executes each of the processes in either one of a privileged mode and a user mode;
   a memory device;
   an I/O controller that is connected to the memory device via an I/O bus, the I/O controller controlling an I/O device and being provided with a first register that is mapped to address space accessible by a user process operating in the user mode, and a second register that is mapped to address space accessible by a privileged process operating in the privileged mode;
   a direct memory access controller that is installed in the I/O controller and performs data transfer between the I/O device and the memory device based on data transfer control information that is set in the first register by the user process; and
   an access control unit that is installed in the I/O controller and is placed between the direct memory access controller and the I/O bus, the access control unit limiting data transfer operation of the direct memory access controller based on an address output from the direct memory access controller and access control information set in the second register by the privileged process and disabling the direct memory access controller from accessing any area other than a predetermined area in the memory device that is accessible by the user process.

2. The information processing apparatus according to claim 1, wherein the access control unit includes a monitoring unit that monitors the address output from the direct memory access controller to limit the data transfer operation of the direct memory access controller.

3. The information processing apparatus according to claim 1, wherein the access control information includes address information that specifies an address range corresponding to the predetermined area, and
   wherein the access control unit includes:
      a monitoring unit that monitors the address output from the direct memory access controller and determines whether or not the address belongs to the address range corresponding to the predetermined area; and
      a disabling unit that disables the direct memory access controller from executing the data transfer operation when the address output from the direct memory access controller belongs to an address range that is out of the address range corresponding to the predetermined area.

4. The information processing apparatus according to claim 3, wherein the access control unit includes a storing unit that stores the address output from the direct memory access controller in the second register to notify the address output from the direct memory access controller to the privileged process when the direct memory access controller is disabled from executing the data transfer operation.

5. An information processing apparatus that executes a plurality of processes concurrently, the information processing apparatus comprising:

a processor that executes each of the processes in either one of a privileged mode and a user mode;

a memory device;

a first I/O controller that is connected to the memory device via an I/O bus, the I/O controller controlling a first I/O device and being provided with a first register that is mapped to address space accessible by a first user process operating in the user mode, and a second register that is mapped to address space accessible by a privileged process operating in the privileged mode;

a second I/O controller that is connected to the memory device via an I/O bus, the I/O controller controlling a second I/O device and being provided with a third register that is mapped to address space accessible by a second user process operating in the user mode, and a fourth register that is mapped to address space accessible by a privileged process operating in the privileged mode;

a first direct memory access controller that is installed in the first I/O controller and performs data transfer between the first I/O device and the memory device based on data transfer control information that is set in the first register by the first user process;

a first access control unit that is installed in the first I/O controller and is placed between the first direct memory access controller and the I/O bus, the first access control unit limiting data transfer operation of the first direct memory access controller based on an first address output from the first direct memory access controller and access control information set in the second register by the privileged process and disabling the first direct memory access controller from accessing any area other than a first area in the memory device that is accessible by the first user process;

a second direct memory access controller that is installed in the second I/O controller and performs data transfer between the second I/O device and the memory device based on data transfer control information that is set in the third register by the second user process; and a second access control unit that is installed in the second I/O controller and is placed between the second direct memory access controller and the I/O bus, the second access control unit limiting data transfer operation of the second direct memory access controller based on an second address output from the second direct memory access controller and access control information set in the fourth register by the privileged process and disabling the second direct memory access controller from accessing any area other than a second area in the memory device that is accessible by the second user process.

6. The information processing apparatus according to claim 5, wherein the first user process executes processing for controlling the first I/O device and the second user process executes processing for controlling the second I/O device.

7. The information processing apparatus according to claim 5, wherein the first access control information includes address information that specifies a first address range corresponding to the first area, and wherein the first access control unit includes:
a first monitoring unit that monitors the first address output from the first direct memory access controller and determines whether or not the first address belongs to the first address range corresponding to the first area; and
a first disabling unit that disables the first direct memory access controller from executing the data transfer operation when the first address output from the first direct memory access controller belongs to an address range that is out of the first address range corresponding to the first area.

8. The information processing apparatus according to claim 5, wherein the second access control information includes address information that specifies a second address range corresponding to the second area, and wherein the second access control unit includes:
a second monitoring unit that monitors the second address output from the second direct memory access controller and determines whether or not the second address belongs to the second address range corresponding to the second area; and
a second disabling unit that disables the second direct memory access controller from executing the data transfer operation when the second address output from the second direct memory access controller belongs to an address range that is out of the second address range corresponding to the second area.

9. A data transfer control method for controlling data transfer between an I/O device and a memory device executed by an I/O controller, wherein the I/O controller is connected to the memory device via an I/O bus, the I/O controller being provided with a direct memory access controller for executing the data transfer, a first register mapped to address space that is accessible by a user process, and a second register mapped to address space that is accessible by a privileged process, the data transfer control method comprising:

executing processing of setting access control information in the second register by the privileged process;

executing processing of setting data transfer control information for controlling the operation of the direct memory access controller in the first register by the user process;

monitoring an address output from the direct memory access controller;

determining whether or not the monitored address belongs to an address range corresponding to a predetermined area in the memory device that is accessible by the user process; and disabling the direct memory access controller from executing the data transfer operation when the address output from the direct memory access controller belongs to an address range that is out of the address range corresponding to the predetermined area.

10. The data transfer control method according to claim 9 further comprising storing the address output from the direct memory access controller in the second register to notify the address output from the direct memory access controller to the privileged process when the direct memory access controller is disabled from executing the data transfer operation.

* * * * *